United States Patent [19]
Müller et al.

[11] Patent Number: 5,179,146
[45] Date of Patent: Jan. 12, 1993

[54] MODIFIED POLYISOCYANATES, A PROCESS FOR THEIR PRODUCTION AND THEIR USE

[75] Inventors: Hanns-Peter Müller, Bergisch-Gladbach; Geza Avar; Christian Weber, both of Leverkusen; Karl-Heinz Dörner, Pulheim; Alexander Karbach, Krefeld; Christian Lindner, Cologne; Rolf Dhein, Krefeld, all of Fed. Rep. of Germany

[73] Assignee: Bayer Aktiengesellschaft, Fed. Rep. of Germany

[21] Appl. No.: 860,622

[22] Filed: Mar. 30, 1992

[30] Foreign Application Priority Data

Apr. 5, 1991 [DE] Fed. Rep. of Germany ....... 4110976

[51] Int. Cl.$^5$ .............................................. C08L 47/00
[52] U.S. Cl. .................................. 524/197; 525/123; 525/127
[58] Field of Search ................ 524/197; 525/123, 127

[56] References Cited

PUBLICATIONS

"Polyurethane", Kunststoff-Handbuch 7, Carl Hanser Verlag, MunchenWien (1983), pp. 78 se seq.

Primary Examiner—Maurice J. Welsh
Attorney, Agent, or Firm—Joseph C. Gil; N. Denise Brown

[57] ABSTRACT

Modified polyisocyanates having an NCO group content of from 10 to 45% by weight, comprising a a) a polyisocyanate component consisting essentially of an organic polyisocyanate having an NCO group content of from 15 to 50% by weight which is liquid at room temperature, and b) 2 to 100% by weight, based on the weight of component a), of a polymer modifier consisting of at least one graft rubber which is dispersed in swollen form in component a), and a process for the production of the new modified polyisocyanates are described. The modified polyisocyanates are also useful in the production of plastics by the isocyanate polyaddition process.

3 Claims, No Drawings

MODIFIED POLYISOCYANATES, A PROCESS FOR THEIR PRODUCTION AND THEIR USE

BACKGROUND OF THE INVENTION

The present invention relates to new modified polyisocyanates, to a process for their production, and to their use as the polyisocyanate component in the production of plastics by the isocyanate polyaddition process, more particularly in the production of polyurethane plastics.

The modification of polyisocyanates for the production of polyurethanes has recently been acquiring increasing significance because the quality standard and the properties of the end products can be specifically influenced in this way (cf. for example "Polyurethane", Kunststoff-Handbuch 7, Carl Hanser Verlag, Munchen-Wien (1983), page 78 et seq).

DESCRIPTION OF THE INVENTION

A simple process has now been found for the production of modified polyisocyanates suitable for the production of isocyanate polyaddition products, more particularly polyurethane plastics, which are distinguished by high rigidity, resistance to chemicals, heat resistance and improved toughness for the same high dimensional stability. It is extremely surprising that the polymer modifiers to be used in accordance with the invention should bring about such improvements in the end products because it is known to the expert that the good development of hard and soft segments is responsible for the quality of the polyurethane plastics. Surprisingly, this is not affected by the presence of the polymer modifiers.

The present invention relates to modified polyisocyanates having an NCO group content of from 10 to 45% by weight, comprising a) a polyisocyanate component consisting essentially of an organic polyisocyanate having an NCO group content of from 15 to 50% by weight which is liquid at room temperature; and b) 2 to 100% by weight, based on the weight of component a), of a polymer modifier consisting of at least one particulate graft rubber which is dispersed in swollen form in component a), said modifier consisting of i) from 20 to 80% by weight of a rubber polymer having a glass transition temperature below 0° C., preferably below −50° C., and ii) from 20 to 80% by weight of vinyl monomers which have been grafted onto the rubber, wherein the weights of components b) i) and b) ii) total 100% of the weight of component b).

Known auxiliaries and additives which are typically encountered in polyurethane chemistry may optionally be included.

The present invention also relates to a process for the production of these modified polyisocyanates which are characterized in that a) a polyisocyanate component consisting of at least one organic polyisocyanate having an NCO group content of from 15 to 50% by weight, which is liquid at room temperature is mixed with b) 2 to 100% by weight, based on the weight of component a) of a polymer modifier consisting of at least one particulate graft rubber, said modifier consisting of i) from 20 to 80% by weight of a rubber polymer having a glass transition temperature below 0° C., preferably below −50° C., and ii) from 20 to 80% by weight of vinyl monomers which have been grafted onto the rubber, wherein the weights of components b) i) and b) ii) total 100% of the weight of component b), and component b) is dispersed in component a), optionally, under the effect of shear forces and elevated temperatures, with swelling of component b). Optional auxiliaries and additives c) may be incorporated in the starting components a) and/or b), and/or in the mixture either during and/or after the dispersion step.

Finally, the present invention also relates to the use of the new modified polyisocyanates as the polyisocyanate component in the production of plastics by the isocyanate polyaddition process, and more particularly in the production of polyurethane plastics.

Starting materials a) are organic polyisocyanates having an NCO group content of from 15 to 50% by weight, and preferably of from 22 to 34% by weight, which are liquid at room temperature. Polyisocyanate mixtures having an average NCO group content of from 15 to 50% by weight, and preferably of from 22 to 34% by weight, are often used as component a). The average molecular weight of the polyisocyantes is generally in the range of from 168 to 1,000 and preferably in the range of from 168 to 300.

Suitable polyisocyanates include, for example, hexamethylene diisocyanate; isophorone diisocyanate; trans-trans cyclohexyl diisocyanate; the isomeric xylylene diisocyanates; 4,4'-diisocyanatodicyclohexy methane; 2,4- and/or 2,6-diisocyanatotoluene; and 4,4'-diisocyanatodiphenyl methane, optionally, in combination with small quantities of 2,2'-diisocyanatodiphenyl methane, and/or higher homologs thereof. It is known that mixtures of polyisocyanates based on 4,4'-diisocyanatodiphenyl methane are formed by the phosgenation of aniline/formaldehyde condensates using known methods. Derivatives of polyisocyanates modified by urethane, and/or carbodiimide, and/or uretdione, and/or isocyanurate, and/or biuret groups are also suitable. The polyisocyanate component a) preferably consists of at least one aromatic polyisocyanate. Polyisocyanates or polyisocyanate mixtures of the diphenyl methane series which are liquid at room temperature, derivatives of these polyisocyanates, or polyisocyanates which are liquid at room temperature are particularly suitable. The polyisocyanate component a) generally has an NCO group content of from 15 to 50% by weight, and preferably of from 22 to 34% by weight.

Component b) of the systems according to the invention may be selected from known graft rubbers consisting of i) a rubber polymer having glass transition temperatures below 0° C., preferably below −50° C. and ii) at least one vinyl monomer which has been grafted onto the rubber. The graft rubbers which suitable as polymer modifiers b) preferably have a particulate structure with average particle diameters (d50 value) of 0.1 to 0.8 μm and are used in the form of corresponding "powders" or even in "coarse particle" form, i.e. in the form of agglomerates of such particles. From about 20 to 80% by weight, and preferably from about 30 to 70% by weight, of the graft rubber consists of a rubber having a glass transition temperature as indicated above; and the remaining % by weight of the graft rubber consists of at least one vinyl monomers which has been grafted onto the rubber.

Suitable rubbers for the production of the graft rubbers include, for example, diene monomer rubbers based on butadiene; isoprene; chloroprene; and optionally in admixture with up to 35% by weight of other monomers, such as styrene; acrylonitrile; or alkyl (meth)acrylate; olefin rubbers based on ethylene; propylene; isobutylene; vinyl acetate; carbon monoxide; alkyl acrylate, and in combination with small quantities of diene monomer or alkyl acrylate rubbers based on alkyl acrylate monomers (more particularly $C_{1-7}$, alkyl acrylate), and optionally in admixture with up to 10% by weight of other vinyl or alkyl monomers. Particularly preferred graft rubbers b) are produced by radical grafting of vinyl monomers onto a rubber polymer which is at least partly crosslinked. The rubber used preferably has a gel content of at least 30% by weight.

Suitable vinyl monomers to be grafted on include, for example, monomers selected from the group consisting of styrene; p-methyl styrene; α-methyl styrene; acrylonitrile; methacrylonitrile; $C_{1-6}$ alkyl (meth)acrylate; vinyl acetate; vinyl ether; maleic anhydride; maleic imides; (meth)acrylamides; and mixtures of such monomers. Styrene/acrylonitrile combinations or combinations containing methyl methacrylate are particularly suitable as the graft monomers.

The graft polymers suitable as component b) are preferably produced by the known method of radical emulsion graft polymerization.

The grafting reaction, emulsion polymerization and bulk polymerization are described in detail in Ullmanns Enzyclopadie, 4th Edition, Vol. 19, pages 277-295. Graft products according to the present invention are polymers produced by polymerization of vinyl monomers in the presence of a rubber. Genuine graft products and ungrafted products of the vinyl monomer are formed in this so-called grafting reaction. According to the present invention, the expression "graft rubber" therefore applies to mixtures of these two products.

The auxiliaries and additives c) typical of polyurethane chemistry which may optionally be present in the modified polyisocyanates according to the invention include those of the type generally known in the art and which are described, for example on pages 92 to 111 of the above-cited Kunstoff-Handbuch. However, the auxiliaries and additives c) are limited to those which can be formulated in a storable form in the systems according to the invention and include, for example, inhibitors, crosslinking agents, chain-extending agents in small quantities, surfactants, flameproofing additives, physical blowing agents, fillers, antiagers, release agents, biocides, additives, dyes, plasticizers, coupling agents, antistatic agents, and small quantities of dehydrating agents, such as tosyl isocyanate.

To carry out the process according to the invention, the organic polyisocyanates a) are preferably introduced first and the polymer modifiers b) are then stirred into component a). Component b) is preferably used in a quantity of from 5 to 50% by weight, based on the weight of component a). The mixture is preferably heated to elevated temperatures of up to 120° C., more preferably to temperatures of 80° to 120° C. However, the polymer modifiers b) may also be mixed with the polyisocyanate component a) at room temperature. This is done by initially introducing component b) in "coarse" form, covering it with a layer of component a), and then stirring the mixture at room temperature in the absence of atmospheric moisture and preferably in an inert gas atmosphere (for example, of nitrogen) or in vacuo.

Modified polyisocyanates according to the invention in which the polymer modifiers b) are dispersed in partly swollen form are formed in both cases. The degree of swelling of the polymer modifiers b) dispersed in component a) is generally from 2 to 6. Determination of the degree of swelling is used to characterize the interaction between polymers and swelling agents. The methods used are described in Hoffman, Martin: Polymeranalytik I und II (1977), ISBN 3-13-519701-8 and ISBN 3-13-519801-4.

The modified polyisocyanates according to the invention are valuable starting materials for the production of plastics by the isocyanate polyaddition process. They are particularly suitable for the production of polyurethane plastics. They are also suitable for the production of thermoplastic polyurethane elastomers, cast elastomers, rigid molded foams, flexible molded foams and molded foams having an integral density distribution. The modified polyisocyanates according to the invention are also particularly suitable as the polyisocyanate component in the production of elastomeric polyurethane moldings having a density in the range from 0.8 to 1.4 $g/cm^3$ on the principle of reaction injection molding. When used in accordance with the invention, the modified polyisocyanates may be combined with any reactants containing isocyanate-reactive hydrogen atoms instead of the organic polyisocyanates normally used. Of course, it is also possible to use typical auxiliaries and additives in reaction mixtures of the type in question which react to form polyurethanes. Relevant particulars can again be found in above-cited Kunststoff-Handbuch.

In the following Examples, all quantities are in % by weight.

EXAMPLES

Polymer modifier b1

A commercially available graft polymer consisting of 30% by weight of a polybutadiene rubber having a glass transition temperature of −80° C. and 70% by weight of a styrene/acrylonitrile copolymer (ratio by weight of styrene to acrylonitrile 72:28) having an average particle size of 0.4 μm (d50 value). The graft polymer was prepared by copolymerization of styrene and acrylonitrile in the presence of an aqueous emulsion of the polybutadiene rubber.

Polymer modifier b2)

A commercially available graft polymer consisting of 55% by weight of a polybutadiene rubber having a glass transition temperature of −80° C. and 45% by weight of a styrene/acrylonitrile copolymer having the composition shown above in b1). The graft polymer was prepared in the same way as the graft polymer mentioned above. It has an average particle size of 0.4 μm (d50 value). It is used in the form of a "coarse powder", i.e. in the form of an agglomerate of fine particles having a particle size in the range mentioned.

Example 1

60 g polymer modifier b2) are covered with a layer of 240 g tolylene diisocyanate (TDI=2,4- and 2,6-isomers in a ratio by weight of 80:20), followed by stirring for 10 hours under nitrogen at room temperature and in the absence of atmospheric moisture in a round-bottomed flask. A vacuum (20 torr) is then applied, and the modified diisocyanate is degassed and is then decanted through a filter. A milky viscous liquid having the following characteristic data is formed in this way:

| NCO content: | 38.4% |
|---|---|
| Viscosity (25° C.): | 3,100 mPa.s |
| Graft polymer content: | 20%, based on TDI |

Determination of the degree of swelling, which is carried out separately, reveals a degree of swelling of 2.64.

Example 2

30 g polymer modifier b2) are covered with a layer of 270 g TDI (NCO content: 48.3%), followed by further treatment as described in Example 1. A milky viscous liquid having the following characteristic data is formed in this way:

| NCO content: | 43.3% |
|---|---|
| viscosity (25° C.): | 65 mPa.s |
| Graft polymer content: | 10%, based on TDI |

Example 3

11.5 g polymer b2) are covered with a layer of 218 g of a tripropyleneglycol-modified 4,4'-diphenyl methane diisocyanate (NCO content: 23%), followed by further treatment as described in Example 1. A milky viscous liquid having the following characteristic data is formed:

| NCO content: | 21.8% |
|---|---|
| viscosity (25° C.): | 2,500 mPa.s |
| Graft polymer content: | 5%, based on starting diisocyanate |

Determination of the degree of swelling, which was carried out separately, revealed a degree of swelling of 3.01.

Example 4

11.5 g polymer modifier b2) are covered with a layer of 218 g of a polyisocyanate mixture of the diphenyl methane series urethanized by reaction with a substoichiometric quantity of tripropylene glycol (NCO content 24.5%, viscosity at 25° C. 510 mPa.s), followed by further treatment as described in Example 1. A milky viscous liquid having the following characteristic data is formed:

| NCO content: | 23.3% |
|---|---|
| Viscosity (25° C.): | 1,900 mPa.s |
| Graft polymer content: | 5%, based on starting diisocyanate |

EXAMPLE 5

60 g polymer modifier b2) are covered with a layer of 240 g isophorone diisocyanate (IPDI, NOC content: 37.9%), followed by further treatment as described in Example 1. A milky viscous liquid having the following characteristic data is formed;

| NCO content: | 30.1% |
|---|---|
| Viscosity (25° C.): | 1,700 mPa.s |
| Graft polymer content: | 20%, based on IPDI |

Determination of the degree of swelling, which was carried out separately, revealed a degree of swelling of 2.59.

Example 6

30 g polymer modifier b2) are covered with a layer of 270 g of a 4,4'-diisocyanatodiphenyl methane modified by partial carbodiimidization of the isocyanate groups (NCO content 29%), follow by further treatment as described in Example 1. A milky viscous liquid having the following characteristic data

| NCO content: | 25.9% |
|---|---|
| Viscosity (25° C.): | 1,500 mPa.s |
| Graft polymer content: | 10%, based on starting polyisocyanates |

Determination of the degree of swelling, which was carried out separately, revealed a degree of swelling of 2.41.

Example 7

11.5 g polymer modifier b2) are covered with a layer of 218 g TDI (NCO content: 48.3%), followed by further treatment as described in Example 1. A milky viscous liquid having the following characteristic data is formed:

| NCO content: | 45.7% |
|---|---|
| Viscosity (25C): | 13 mPa.s |
| Graft polymer content: | 5%, based on TDI |

Example 8

60 g polymer modifier b2) are covered with a layer of 240 g 4,4'-diisocyanatodicyclohexyl methane (NCO content: 31.8%), followed by further treatment as described in Example 1. A milky viscous liquid having the following characteristic data is formed:

| NCO | 25.4% |
|---|---|
| Viscosity (25° C.): | 40,000 mPa.s |
| Graft polymer content: | 20%, based on starting polyisocyanate |

Determination of the degree of swelling, which was carried out separately, revealed a degree of swelling of 5.93.

Example 9

60 g polymer modifier b1) are covered with a layer of 240 g TDI (NCO content: 48.3%), followed by further treatment as described in Example 1. A milky viscous liquid having the following characteristic data is formed in this way:

| NCO content: | 37.6% |
|---|---|
| viscosity (25° C.): | 7,700 mPa.s |
| Graft polymer content: | 20%, based on TDI |

Example 10

800 g of polymer modifier b2) are added in portions with stirring at room temperature and in a nitrogen atmosphere to 3,200 g of a technical polyisocyanate mixture of the diphenyl methane series (NCO content 31.2%, viscosity at 25° C. 35 mPa.s) containing 90% diisocyanatodiphenyl methane isomers and 10% higher homologs. The coarse particle dispersion formed is heated to 90° C. and stirred for 3 hours at 90° C./20 mbar for swelling. A very fine particle, non-sedimenting dispersion is formed. After cooling, the modified polyisocyanate mixture has the following characteristic data:

| | |
|---|---|
| Viscosity (25° C.): | 3,160 mPa.s |
| NCO content: | 25.1% |
| Graft polymer content: | 20%, based on starting polyisocyanate |

Example 11 (use according to the invention)

253 g of the modified polyisocyanate of Example 10 are introduced into a reaction flask and mixed with 236.5 g of a polyether polyol mixture. The reaction mixture is then degassed with stirring at 3020 C. by application of a vacuum and the homogeneous mixture obtained is poured into a standing mold (25×30×0.4 cm). The filled mold is then heated for 16 hours at 100° C. in a drying cabinet.

The polyether polyol mixture is a mixture of 162 g propoxylated glycerol, OH value 250, and 74.5 propoxylated trimethylol propane, OH value 543. The above-mentioned quantities of starting materials used corresponding to an NCO index of 104.

A rigid, solid, opaque polyurethane sheet is obtained in this way and is distinguished from a sheet based on the unmodified starting polyisocyanate mixture of Example 10 produced in exactly the same way, i.e. under otherwise the same reaction conditions, by distinctly improved impact strength and equally high heat resistance.

Although the present invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Modified polyisocyanates having an NCO group content of from 10 to 45% by weight, comprising
   a) a polyisocyanate component consisting essentially of an organic polyisocyanate having an NCO group content of from 15 to 50% by weight which is liquid at room temperature, and
   b) 2 to 100% by weight, based on the weight of component a), of a polymer modifier consisting of at least one particulate graft rubber which is dispersed in swollen from in component a), said modifier consisting of
      i) from 20 to 80% by weight of a rubber polymer having a glass transition temperature below 0° C., and
      ii) from 20 to 80% by weight of vinyl monomers which have been grafted onto the rubber, wherein the weights of components b) i) and b) ii) total 100% of the weight of component b).

2. A process for the production of modified polyisocyanates according to claim 1, characterized in that
   a) a polyisocyanate component consisting of at least one organic polyisocyanate having an NCO group content of from 15 to 50% by weight which is liquid at room temperature
   is mixed with
   b) 2 to 100% by weight of component a), of a polymer modifier consisting of at least one particulate graft rubber, said modifier consisting of
      i) from 20 to 80% by weight of a rubber polymer having a glass transition temperature below 0° C., and
      ii) from 20 to 80% by weight of vinyl monomers which have been grafted onto the rubber, wherein the weights of components b) i) and b) ii) total 100% of the weight of component b),
   and component b) is dispersed in component a), optionally, under the effect of shear forces and elevated temperatures, with swelling of component b).

3. A process for the production of plastics by the isocyanate polyaddition process wherein the polyisocyanate component comprises modified polyisocyanates according to claim 1.

* * * * *